United States Patent [19]

Kreischer

[11] Patent Number: 5,172,885
[45] Date of Patent: Dec. 22, 1992

[54] UMBRELLA SUPPORT

[76] Inventor: Marjory K. Kreischer, R.D. 3, Box 347, Towanda, Pa. 18848

[21] Appl. No.: 674,206

[22] Filed: Mar. 25, 1991

[51] Int. Cl.$^5$ .................. A45B 25/00; A47G 29/00
[52] U.S. Cl. .................. 248/539; 248/231.4; 248/215
[58] Field of Search ............... 248/539, 540, 514, 534, 248/536, 214, 222.1, 311.2, 314, 229, 541, 354.5, 21, 304–306, 231.4, 316.4, 295.1; 24/573.1–537.7; 224/274, 30 A, 915

[56] References Cited

U.S. PATENT DOCUMENTS

| | | | |
|---|---|---|---|
| 278,973 | 6/1883 | Kizer | 248/514 |
| D. 311,129 | 10/1990 | Barnhill, III | 248/514 X |
| 488,549 | 12/1892 | Dugan | 248/514 |
| 617,096 | 1/1899 | Harrison et al. | 248/541 X |
| 1,096,999 | 5/1914 | Burtchett | 248/539 |
| 2,446,255 | 8/1948 | Vocisano | 248/354.5 X |
| 2,983,438 | 5/1961 | Brockman | 248/539 |
| 3,148,851 | 9/1964 | Condon | 248/515 |
| 3,167,284 | 1/1965 | Lynch | 248/225.1 |
| 3,176,699 | 4/1965 | Rollins | 248/539 |
| 3,358,957 | 12/1967 | Lindenmuth | 248/231.4 X |
| 3,602,466 | 8/1971 | Drowns | |
| 4,334,692 | 6/1982 | Lynch | |
| 4,522,300 | 6/1985 | Hamblet | |
| 4,570,894 | 2/1986 | Miele | |
| 4,572,473 | 2/1986 | Seely | 248/354.5 X |
| 4,609,175 | 9/1986 | Conover | 248/519 |
| 4,887,786 | 12/1989 | Stokes | 248/512 |
| 5,022,104 | 6/1991 | Miller | 248/558 X |

FOREIGN PATENT DOCUMENTS 171219 10/1951 Fed. Rep. of Germany ... 224/30 A

Primary Examiner—Karen J. Chotkowski
Attorney, Agent, or Firm—Richard G. Stephens

[57] ABSTRACT

A holder assembly for mounting an umbrella on any of a variety of wire baskets used on golf carts includes a hollow tube in which an umbrella handle may be inserted and retained against accidental removal, with means to readily adjust the height of the umbrella, and means to accommodate various shapes and placements of wire baskets. The assembly also may be used on various other vehicles, and it is readily installable and removable without the use of tools.

6 Claims, 3 Drawing Sheets

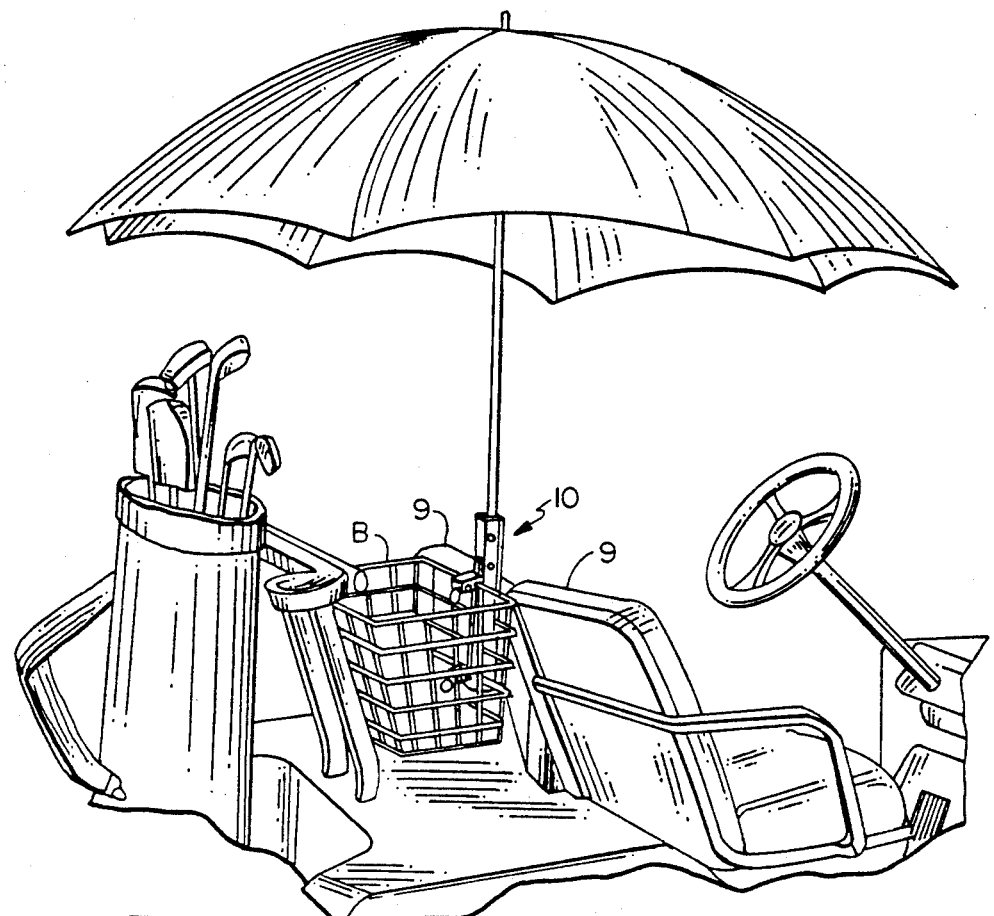
FIG.1
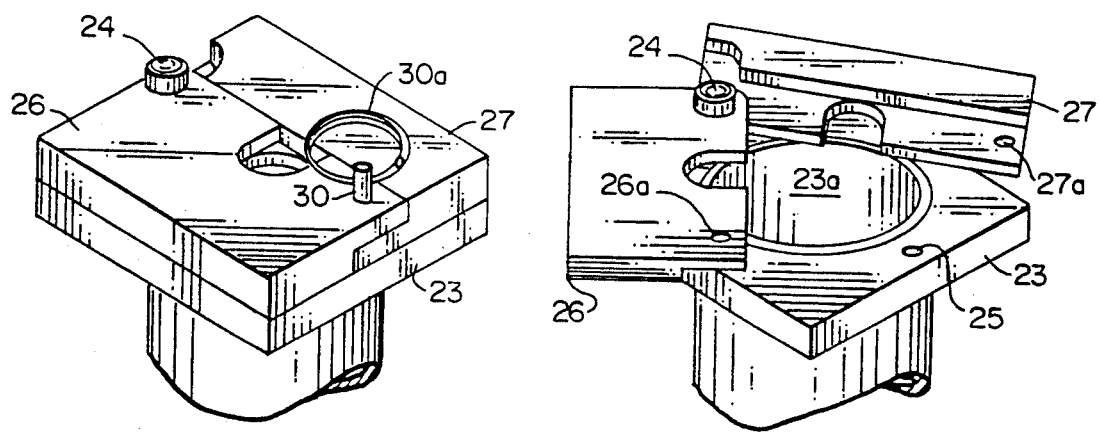
FIG.4
FIG.5

UMBRELLA SUPPORT

My invention relates to umbrella supports, and more particularly, to an improved portable umbrella support which is useful to support an umbrella, or a like device such as a parasol, aboard a variety of different vehicles. The invention was originally devised to support an umbrella aboard any of a variety of golf carts, but it will become apparent as the description proceeds that the invention well may find application on bicycles, shopping carts, boats, and other vehicles.

PRIOR ART

The following prior patents may be of interest:

Heermance U.S. Pat. No. 63,517, Kizer U.S. Pat. No. 278,973

Dutton U.S. Pat. No. 378,829, Dugan U.S. Pat. 488,549

Phillips U.S. Pat. No. 499,933, Hughes U.S. Pat. No. 593,018

Mitchell U.S. Pat. No. 988,485, Rauch U.S. Pat. No. 1,020,846

Burtchett U.S. Pat. No. 1,096,999, Dearman U.S. Pat. No. b 1,597,266

Beehler U.S. Pat. No. 1,892,601, Mott U.S. Pat. No. 2,154,634

Johansen U.S. Pat. No. 2,822,143, Wright U.S. Pat. No. 2,988,310

Condon U.S. Pat. No. 3,148,851, Lynch U.S. Pat. No. 3,167,284

Wood U.S. Pat. No. 3,353,852, Drowns U.S. Pat. No. 3,602,466

Lynch U.S. Pat. No. 4,334,692, Rosen U.S. Pat. No. 4,455,030

Hamblet U.S. Pat. No. 4,522,300, Proffit U.S. Pat. No. 4,550,930

Miele U.S. Pat. No. 4,570,894, Conover U.S. Pat. No. 4,609,175

Chen U.S. Pat. No. 4,871,141, Stokes U.S. Pat. No. 4,887,786

Moineau U.S. Pat. No. 4,974,807, Dotter Des. No. 237,941

Kriegner Des. No. 252,318, Barnhill Des. No. 311,129

It will be apparent from some of the above-cited prior art that many persons have devised various devices for supporting an umbrella aboard a golf cart or other vehicle.

One object of the present invention is to provide an umbrella-holding device which is small and compact, and readily-carried in a golf bag, which may be readily attached to and detached from a usual, or standard form, of golf cart.

Most prior types of umbrella holders technically can be attached to and detached from some form of golf cart, but only through operations which are time-consuming and/or which require the use of tools, such as a screwdriver or pliers. An important object of the invention is to provide an umbrella-holding device which can be attached to and detached from a standard golf cart very rapidly, and without the use of tools.

A related object of the invention is to provide an umbrella holder which is unitary rather than comprising plural separate parts, which might be easily lost.

Another object of the invention is to provide an umbrella holder which can be readily attached to and detached from a golf cart by persons of limited strength and/or limited mechanical ability. Desirably, the invention avoids the use of thumbscrews and knurled-head machine screws, which many persons find difficult to tighten and loosen.

Most golf carts are provided with a wire basket within easy reach of the riders, (often on the backs of the rider seats) in which basket golf balls, clothing, lunches and the like may be carried. It becomes desirable to provide an umbrella support at essentially the same location, so that the umbrella will tend to protect both the riders, golf bags, the vehicle steering wheel, and the contents of the basket from rain and/or sun, and hence another object of the invention is to provide an umbrella holder which may be readily installed and removed from a wire basket adjacent a seat back of a golf cart.

To best function to protect the riders and the contents of such a wire basket, it is important that the umbrella handle shaft extend approximately vertically. Some wire baskets in common use have vertically sloping sides, while others have approximately vertical sides. Another object of the present invention is to provide an umbrella holder which will support an umbrella handle shaft approximately vertically with either type of wire basket.

The wire baskets commonly used on golf carts use a variety of pitch spacings between wires. Another object of the invention is to provide an umbrella holder which may be used with a wide variety of basket sizes and wire pitch spacings.

The handles at the lower ends of golf umbrella shafts occur in a variety of sizes. A further object of the invention is to provide an umbrella holder which will accommodate a wide variety of handle sizes, without a handle size controlling or constraining the normal elevation to which the umbrella shaft may be adjusted.

It is desirable that an umbrella be supported a limited distance above the heads of the riders to best protect them from the elements, but not so close to the riders heads as to interfere with the driver's vision. Another object of the invention is to provide an umbrella holder with which the elevation of the umbrella may be readily adjusted, again without the use of tools. A further attendant object of the invention is to provide an umbrella holder which will support an umbrella without undue wobbling, since the spokes on an umbrella can strike or scratch a user in the absence of a mounting which obviates undue wobbling.

Some prior umbrella holders are undesirable because they depend upon gravity to maintain an umbrella shaft in a holder. Wind sometimes lifts an umbrella from such a holder, which can be dangerous to the users as well as requiring an irritating chase. Another object of the invention is to provide an umbrella holder which will not allow an umbrella to be accidentally freed from the holder even in the presence of high wind.

While it is desirable to support an umbrella so that the shaft does not appreciably wobble so as to markedly disturb the approximately vertical position of the umbrella shaft, it is desirable that the shaft angle be allowed to move slightly, that the shaft be allowed a limited amount of lifting from a lowered position to which it was adjusted, and that the shaft be allowed to rotate. Such motions decrease the bending moments applied to the umbrella shaft, and tend to decrease forces which vehicle motion and/or wind apply to the umbrella fabric and spokes. Thus another object of the invention is to provide an umbrella holder which will allow an umbrella to wobble, lift and lower in small amounts, and to rotate.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is an isometric view of a portion of a golf cart showing a preferred form of the invention installed on a wire basket.

FIGS. 4 and 5 are isometric views of a top end portion of the holder of FIGS. 1-3, with FIG. 4 showing that top portion closed and FIG. 5 showing that top portion open.

Referring to FIG. 1, the umbrella holder 10 of the present invention is shown attached to a wire basket B which is mounted in a conventional fashion on a golf cart just behind the backs 9, 9 of two occupant seats, so that the umbrella covers and protects both riders who occupy the seats and the contents of basket B.

Figure 2:
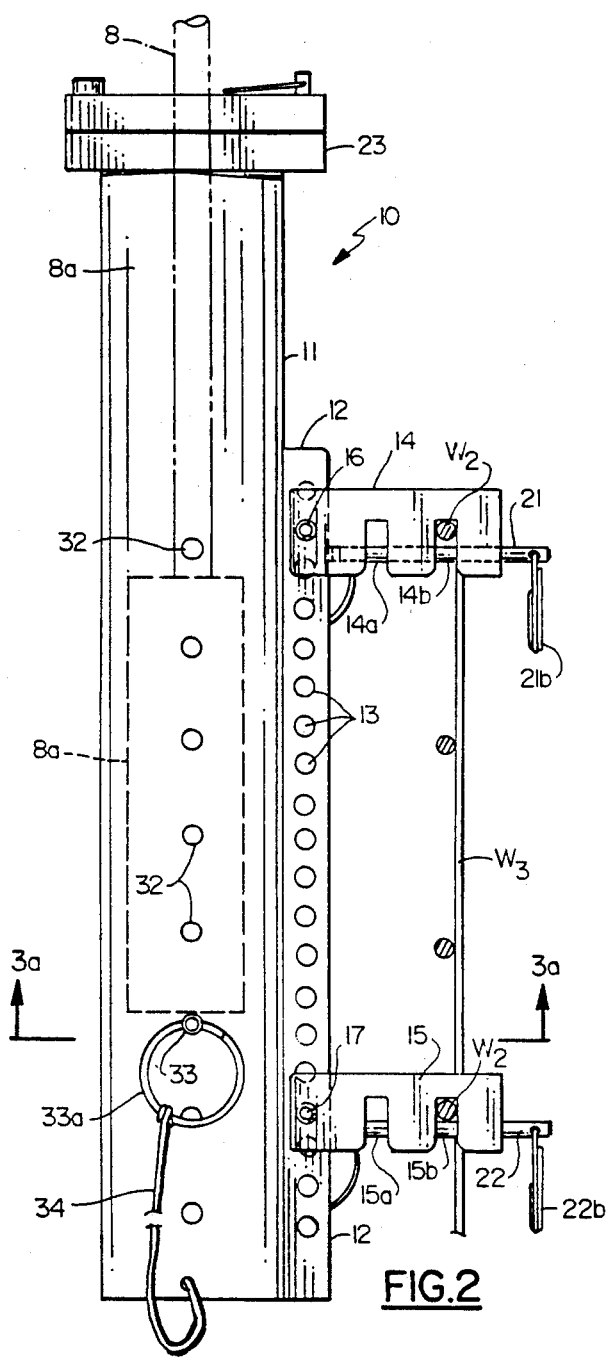
FIG. 2 is a side elevation view of the preferred form of holder with portions of a wire basket shown in cross-section and the bottom portion of a conventional golf umbrella shaft shown, for ease of understanding how the shaft is supported within the holder and how the holder may be attached to and detached from the basket.
Figure 3:
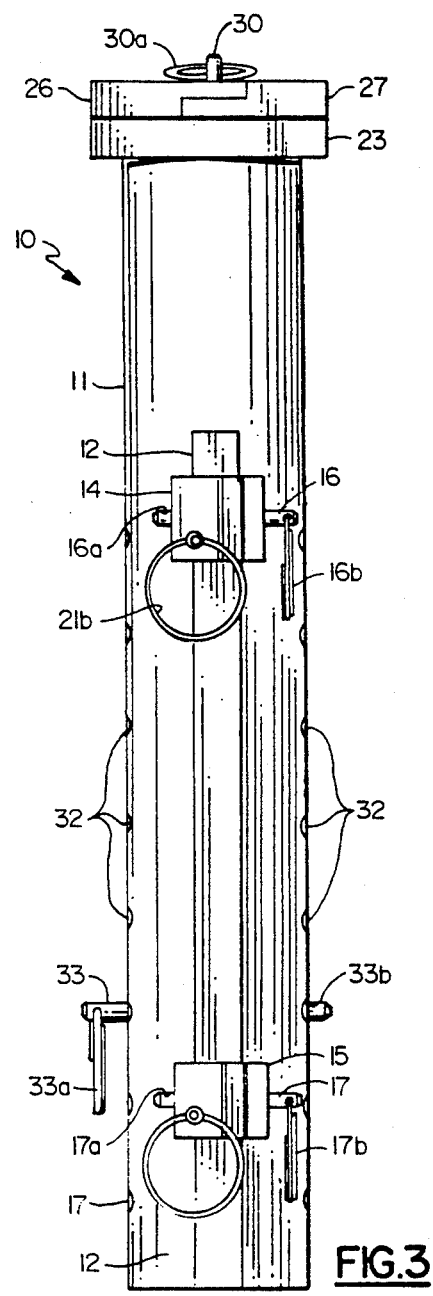
FIG. 3 is a rear elevation view of the holder of FIG. 2.
Figure 3A:
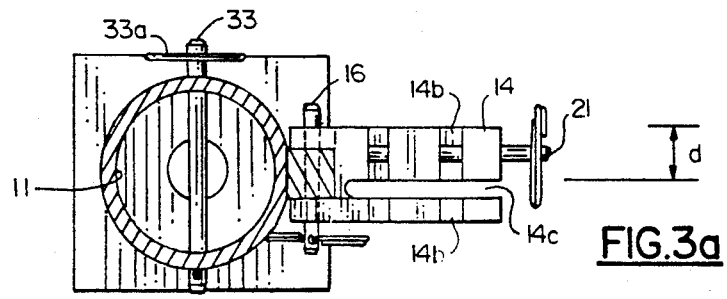
FIG. 3a is a cross-section view taken at lines 3a—3a in FIG. 2.

Referring to FIGS. 2, 3 and 3a, holder 10 is shown including a hollow tube 11, which is preferably cylindrical, and preferably formed of plastic, having a boss 12 rigidly affixed thereto and extending along a portion of tube 11. Boss 12 is provided with a plurality of through holes 13, 13 spaced apart along much of its length. In FIG. 2 a portion of an umbrella shaft 8 carrying a lower end handle 8a is shown in dashed lines, with all of the handle lowered into hollow tube 11. The diameter of handle 8a materially exceeds the diameter of the shaft. The shaft and handle are shown as being circular in cross-section, but they need not be. The handle merely need dimensions such that it may be lowered inside tube 11 and so that it exceeds the shaft in cross-section. In one successful embodiment of the invention tube 11 comprised a rigid PVC tube approximately 12 inches long with an outside diameter of 1.9 in. and an inside diameter of 1.6 in.

An upper clamp member 14 and a lower clamp member 15 are shown spaced vertically apart along boss 12 and held in place by a pair of pins 16, 17 which each extend through a respective selected hole along the boss and through a pair of holes in each clamp member. The distal ends of pins 16 and 17 preferably are equipped with spring-urged detenting balls 16a, 16b to releasably hold the pins in place once they are inserted to the positions shown. The proximal ends of pins 16, 17 are equipped with metal rings 16b, 17b through which one can extend one's finger to readily remove the associated pin, after which either clamp member may be adjusted vertically along boss 12 until pin 16 or pin 17 engages a different hole along boss 12. Rings 16b, 17b also facilitate pushing their associated pins through the clamp members and boss 12 to hold the clamp members in place.

A pin 21 is shown extending toward tube 11 through a throughhole at the outer (right side in FIG. 2) end portion of upper clamp member 14, through a slot 14b, through a central portion of clamp member 14, through a slot 14a in member 14 and into a hole near the inner end of member 14. A pin 22 is similarly shown extending toward tube 11 through a through-hole at the outer end portion of lower clamp member 15, through a slot 15b, through a central portion of clamp member 15, through a slot 15a, and into a hole near the inner end of member 15. Pins 21 and 22 are each preferably provided with a ball detent positioned on the pin so that it will lie in a slot (e.g., 14a or 14b) when the pin is fully inserted, holding those pins in place until they are intentionally removed by pulling on rings 21b, 22b.

The vertical distance between the seats of slots 14a, 14b and the top edge of pin 21 slightly exceeds the diameter of the transverse wires used at the upper and lower edges of most golf cart wire baskets, so that upon insertion of pins 21 and 22 the captured wires $W_1$ and $W_2$ normally are captured with very little vertical play. Clamp members 14 and 15, which are preferably molded plastic, are preferably identical to each other, which leads to manufacturing economy.

To install holder 10 on the side of a wire basket, upper clamp member 14 is positioned vertically along boss 12 until a transverse basket wire $W_1$ near the top of the basket seats within a selected slot in clamp member 14, and then pin 16 is installed. Lower clamp member 15 is similarly positioned vertically along boss 12 until a transverse basket wire $W_2$ near the bottom of the basket seats within a selected slot in clamp member 15, and then pin 17 is installed. By providing holes 13 along boss 12 at small intervals, such as 0.25 inch, the clamps may be installed on most conventional wire baskets with very little vertical play. The distal ends of pins 16, 17, 21 and 22 are preferably rounded to facilitate insertion.

In FIG. 2 the upper transverse basket wire $W_1$ is shown seated in slot 14b of clamp member 14, and the lower transverse basket wire $W_2$ is shown seated in slot 15b of clamp member 15. Because slots 14b and 15b are equidistant from tube 11, placement of those basket wires in those slots serves to position tube 11 parallel to a plane which includes basket wires $W_1$ and $W_2$. Because slots 14a and 15a are also equidistant from tube 11, installation of clamp members 14 and 15 so that wires $W_1$ and $W_2$ instead seated in slots 14a, 15a similarly would position tube 11 parallel to the mentioned plane, but with tube 11 closer to the side of the basket containing wires $W_1$, $W_2$, which can be advantageous in accommodating certain basket mountings which users of the umbrella holder may encounter.

In FIG. 1 holder 10 is shown installed with tube 11 outside the basket and most of the lengths of clamp members 14 and 15 extending rearwardly into the basket. However, with some golf carts the tube may be positioned inside the basket, with clamp members extending forwardly to attach to transverse wires at the front side of the basket.

The slot pairs 14a, 15a and 14b, 15b may be deemed mating slots because both slots of a pair are equidistant from tube 11. The clamp members ordinarily are installed with the wire pair seated in mating slots when the side of the basket to which they are attached extends substantially vertically (when the golf cart sits on substantially level ground), thereby causing tube 11 to extend substantially vertically. However, by the provision of plural slots (e.g., 14a, 14b) in each clamp member, tube 11 may be arranged to extend substantially vertically even if the plane of the side of the wire basket departs from a vertical plane. If wire $W_1$ is seated in slot 14a and wire $W_2$ is seated in slot 15b, for example, it will become evident that tube 11 will be canted with respect to the plane defined by wires $W_1$ and $W_2$, but if that plane is itself canted relative to the vertical axis of the golf cart (i.e., the vertical direction when the cart is situated on level ground), it will be seen that such canting by use of non-mating slots will allow the user to better orient tube 11 near the proper vertical position. The use of plural slots along each clamp member also allows a user to intentionally tilt or pitch umbrella position slightly forwardly or rearwardly, should the user prefer such an orientation.

In FIG. 3a a slot 14c through the entire height of clamp member 14 is shown spaced from and extending parallel to pin 21, from the outer end of member 14 to a location short of pin 16. Provision of that slot allows a vertically-extending basket wire (e g., $W_3$ in FIG. 2) to enter that slot. Thus clamp 14 (and clamp 15) may be installed on any basket where the spacing between vertically-extending wires does not exceed the dimension shown at $\underline{d}$ in FIG. 3a.

Once the holder has been mounted on the wire basket, installation of the umbrella shaft and handle into tube 11 may be readily accomplished. As seen in FIGS. 2-5, the upper end of tube 11 carries a flat plate 23 integrally formed with or attached to tube 11. Plate 23 has a through hole 23a corresponding in diameter to the inside diameter of hollow tube 11, a headed pivot pin 24 staked into plate 23, and a hole 25 (FIG. 5) near an opposite edge. Pivot pin 24 pivotally retains two pivoting plate members 26 and 27 atop plate 23. As seen in FIGS. 3-5, pivoting plate members 26, 27 are mutually recessed so that they may be swung to a closed position to fit together in a rectangular configuration which matches the periphery of stationary plate 23, as shown in FIGS. 3 and 4. While the peripheries of plate 23 and the closed configuration of plates 26, 27 are shown as being square, it will be evident that they instead may be a different rectangular shape, or hexagonal or circular, if desired. Cut away portions 26a, 27a of plates 26, 27 cooperate in the closed position (FIGS. 3 and 4) to provide a circular upper opening which is much smaller than the inside diameter of tube 11, and which only slightly exceeds the usual diameter of a conventional umbrella shaft.

With tube 11 mounted on the basket, and with plates 26, 27 open as shown in FIG. 5, the handle 8a of the umbrella may be lowered inside the tube. Then plate members 26, 27 may be swung to the closed position of FIG. 4, with the opening provided by plates 26, 27 loosely surrounding the umbrella shaft 8, and plates 26, 27 may be locked in the closed position by insertion of pin 30 (FIGS. 3, 4) through holes 26a, 27a and 25, which register when plates 26, 27 have been swung to the closed position. Pin 30 is equipped with a ball detent (not shown) and a ring 30a to releasably lock the pin in place and to facilitate removal.

Tube 11 is provided with mating pairs of holes 32, 32 through its walls, through which a selected pair pin 33 is inserted to limit the lowering of the umbrella handle and thereby determine the normal elevation of the umbrella relative to holder 10. Pin 33 is equipped with a ring 33a and a ball detent 33b. While the lower end of handle 8a normally rests atop pin 33, wind sometimes may cause a lifting of the umbrella. With plates 26, 27 in the closed position, the umbrella may lift until handle 8a strikes the bottoms of plates 26, 27, but no further, because those plates capture the handle inside tube 11. It will be seen that the holder does not constrain the handle or umbrella shaft against rotation. It also will be seen that because the inside diameter of tube 11 exceeds the diameter of the handle, the umbrella may wobble back and forth a limited amount, with the lower end of the handle alternately striking the front and rear walls of tube 11.

While it is by no means necessary for use of the invention, it may be noted that if the inside diameter of tube 11 slightly exceeds the diameter of regulation golf balls, one or several such balls may be stored inside tube 11 atop pin 33, so that handle 8a will seat atop a golf ball rather than on pin 33.

While it generally has not been shown, so as not to obscure important details in the drawings, each of removable pins 16, 17, 21, 22, 30 and 33 preferably is attached to tube 11 by a length of chain or flexible cord extending from a respective ring to tube 11. As an example, cord 34 is shown in FIG. 2 extending from ring 33a to tube 11, with one end of the cord fixedly attached to the tube by any suitable means, such as epoxy cement. With the pins so attached, none will be lost during use or storage of the holder.

It should be noted at this point that upward movement of the umbrella in case of wind can be limited to less motion, if desired, by insertion of a shortened pin through a wall of tube 11 above the handle 8a. If a pin (not shown) which extends inside tube 11 nearly to shaft 8 is inserted into the uppermost hole 32 shown in FIG. 2, it will be seen that upward movement of the shaft would be limited by the upper edge of handle 8a striking that pin, and that with use of that strategem, cover plates 23, 26 and 27 could be omitted, if desired. Thus a plurality of spaced holes may be provided in tube 11 above the uppermost hole 32 shown in FIG. 2 for such a purpose.

Figure 6:
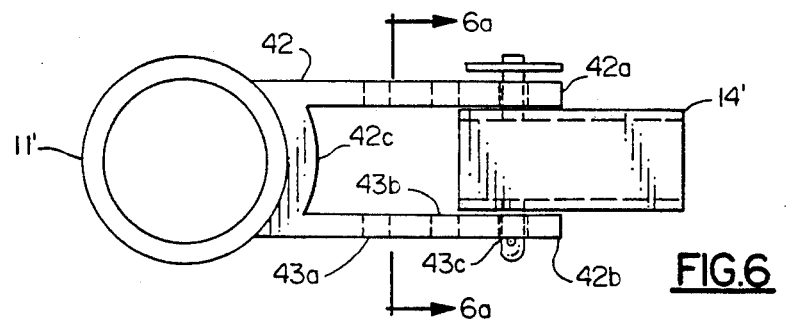
FIG. 6 is a plan view illustrating one possible modification of the invention.
Figure 6A:
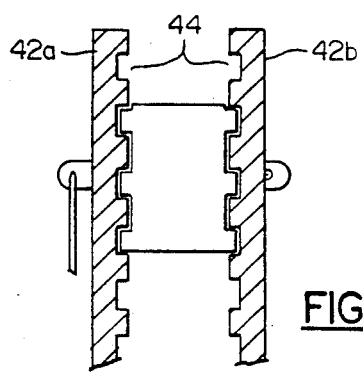
FIG. 6a is a cross-section view taken at lines 6a—6a in FIG. 6.

In a modified form of the invention illustrated in FIGS. 6 and 6a, a hollow tube 11' carries a generally channel-shaped bracket 42 having side or flange portions 42a, 42b and a web portion 42c. Bracket 42 extends along a substantial length of tube 11', much like boss 12 does in FIG. 2. Flanges 42a and 42b carry a plurality (three are shown) of columns of mating through holes, as at 43a, 43b and 43c. The inner sides of flanges 42a, 42b carry a plurality of recesses 44, 44 and adjacent ridges spaced at uniform intervals over most of the height of the flanges. A clamp member 14' may correspond to clamp 14 of FIGS. 2 and 3 except that the sides of member 14' are provided with spaced ridges and recesses which slidingly register with the ridges and recesses of flanges 42a, 42b, and the plurality of slots 14a, 14b (FIG. 2) may be replaced by a single such slot, such as 14b, for reasons which will become apparent. A second clamp member (not shown) may be identical to member 14'. The clamp members may be slid between flanges 42a, 42b at any selected one of a plurality of height positions where the clamp member ridges register with the flange recesses, and then slid toward web 42c and tube 11' until a pair of holes 46, 46 in member 14' register with a pair of mating holes in either column 43a, column 43b, or column 43c, and then pin 16' may be inserted to releasably fix the position of member 14' relative to channel 42 and tube 11'.

It will be apparent now that the holder of the present invention may be installed and removed readily without the use of any tools and by a person having modest strength and mechanical ability. Because the holder is small and compact, it may be readily carried in a golf bag.

Figure 7:
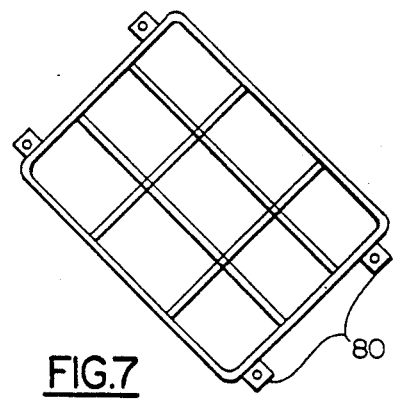
FIG. 7 is an isometric view of a common piece of wire grid which may be used in some applications of the invention.
Figure 8:
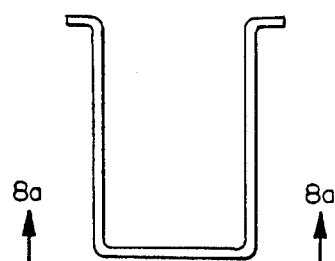
FIGS. 8 and 8a illustrate another type of bracket which may be used in some applications of the invention.
Figure 8A:

While the holder of the present invention has been described as being mountable on a wire basket, it should be noted that the holder can instead be mounted upon a section of wire grid, or on a pair of simple wire or plastic brackets. In FIG. 7 a section of wire grid of a type commonly sold for shelving purposes is shown, equipped with four mounting feet 70, 70. Such a grid may be attached with suitable spacers to any of a wide variety of generally-planar panels, such as a door or a wall, and the umbrella holder of the invention may be readily clamped to the grid, which closely resembles the side of a wire basket. In FIGS. 8 and 8a a simple generally U-shaped bracket having two mounting feet is shown. A pair of such brackets may be fastened to a panel, and then the umbrella holder readily mounted on the bracket pair. Installation of the grid or the bracket pair ordinarily will require the use of small tools, but mounting and dismounting of the holder will not require the use of tools.

Figure 9:
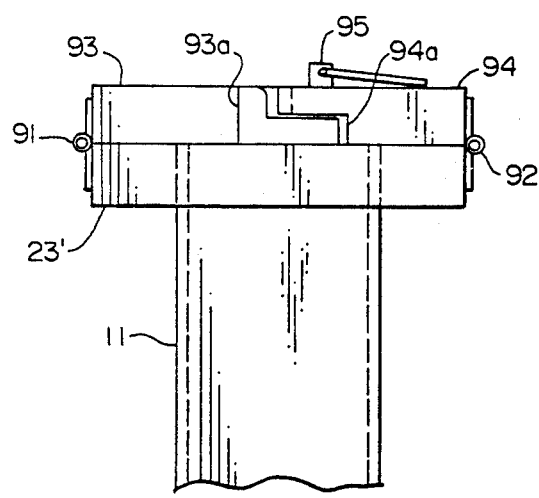
FIG. 9 is a side elevation view illustrating one possible modified form of cover assembly which may be used with the invention.

In the modified cover assembly shown in FIG. 9, a pair of cover plates 93, 94 are connected to plate 23' by hinges 91, 92. If pin 95 is removed, plates 93 and 94 may be swung back to completely bare the upper end of tube 11 for insertion or removal of an umbrella handle. Plates 93, 94 carry semi-circular cutaway edges 93a, 94a, so that they present a reduced circular opening for the umbrella shaft when those plates are swung to the closed position shown.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. An umbrella holder for supporting an umbrella or like device, comprising, in combination:
   a hollow tube;
   means for clamping said tube to a pair of wires at a selected height relative to said wires, said tube having a plurality of pairs of holes spaced apart along the tube, the holes of each pair being spaced from each other on opposite side walls of said tube;
   a pin which may be selectively inserted into a selected pair of said holes to limit the distance which an umbrella shaft may be inserted into said tube; and
   cover means attached to said tube and movable between open and closed conditions, said cover means presenting in the closed condition an opening through which an umbrella shaft may extend but through which an umbrella handle may not pass.

2. An umbrella holder for supporting an umbrella or like device on a vehicle, comprising, in combination:
   a hollow tube;
   means for supporting said tube substantially vertically on said vehicle, said tube having a plurality of pairs of holes spaced apart along said tube, the holes of each pair being spaced from each other on opposite side walls of said tube;
   and a pin which may be selectively inserted into a selected pair of said holes, whereby said pin will limit the distance which an umbrella shaft may be inserted within said hollow tube and thereby determine the elevation of the spokes and fabric of said umbrella relative to said vehicle, said umbrella holder having adjustable cover means fastened adjacent the upper end of said tube, said adjustable cover means being pivotable between an open condition at which said cover means bare substantially the entire inside diameter of said hollow tube and a closed condition at which said cover means bare a lesser amount of the inner cross-sectional area of said tube, whereby the vertical lifting of an umbrella shaft having an enlarged handle will be limited.

3. The umbrella holder of claim 2 having a removable cover pin insertable to hold said cover means in said closed condition.

4. The umbrella holder of claim 2 wherein said adjustable cover means comprises two pivotally-mounted plates mounted adjacent the top of said tube.

5. An umbrella holder for supporting an umbrella or like device on a vehicle, comprising, in combination: a hollow tube; means for supporting said tube substantially vertically on said vehicle, said tube having a plurality of pairs of holes spaced along said tube, the holes of each pair being spaced from each other on opposite side walls of said tube; and a pin which may be selectively inserted into a selected pair of said holes, whereby said pin will limit the distance which an umbrella shaft may be inserted within said hollow tube and thereby determine the elevation of the spokes and fabric of said umbrella relative to said vehicle, said means for supporting said tube comprising clamping means adjustably positionable along the length of said tube to adjust the elevation of said tube relative to said vehicle, said umbrella having a boss extending along said tube, said boss having a plurality of holes, and pin means selectively insertable into selected holes of said boss to adjust the position of said clamping means along said tube.

6. The umbrella holder of claim 5 wherein each of said clamping members includes a plurality of wire-accommodating slots spaced at different distances from said tube when said clamping members are attached to said tube and respective removable pin means for retaining wires in selected slots of said clamping means, whereby the selection of the slots in which a pair of wires are retained fixes an angle of said tube relative to a plane defined by said pair of wires.

* * * * *